United States Patent
Liang (10) Patent No.: US 8,157,505 B2
(45) Date of Patent: Apr. 17, 2012

(54) TURBINE BLADE WITH SINGLE TIP RAIL WITH A MID-POSITIONED DEFLECTOR PORTION

(75) Inventor: George Liang, Palm City, FL (US)

(73) Assignee: Siemens Energy, Inc., Orlando, FL (US)

( * ) Notice: Subject to any disclaimer, the term of this patent is extended or adjusted under 35 U.S.C. 154(b) by 364 days.

(21) Appl. No.: 12/464,476

(22) Filed: May 12, 2009

(65) Prior Publication Data
US 2010/0290920 A1 Nov. 18, 2010

(51) Int. Cl.
*F03B 11/00* (2006.01)
(52) U.S. Cl. .......... 415/115; 415/173.1; 415/173.4; 416/90 R; 416/92; 416/96 R; 416/96 A; 416/97 R
(58) Field of Classification Search .......... 415/115, 415/173.1, 173.4; 416/90 R, 92, 96 R, 96 A, 416/97 R, 228, 224, 95
See application file for complete search history.

(56) References Cited

U.S. PATENT DOCUMENTS

| | | | |
|---|---|---|---|
| 5,660,524 A | 8/1997 | Lee et al. | |
| 6,036,441 A | 3/2000 | Manning et al. | |
| 6,059,530 A | 5/2000 | Lee | |
| 6,179,556 B1 | 1/2001 | Bunker | |
| 6,186,741 B1 | 2/2001 | Webb et al. | |
| 6,224,337 B1 | 5/2001 | Lieland et al. | |
| 6,431,832 B1 | 8/2002 | Glezer et al. | |
| 6,478,537 B2 | 11/2002 | Junkin | |
| 6,494,678 B1 | 12/2002 | Bunker | |
| 6,602,052 B2 * | 8/2003 | Liang | 416/97 R |
| 6,672,829 B1 | 1/2004 | Cherry et al. | |
| 6,790,005 B2 | 9/2004 | Lee et al. | |
| 6,837,683 B2 | 1/2005 | Dailey | |
| 6,991,430 B2 | 1/2006 | Stec et al. | |
| 7,029,235 B2 * | 4/2006 | Liang | 416/92 |
| 7,163,373 B2 | 1/2007 | Liang | |
| 7,168,921 B2 | 1/2007 | Honkomp et al. | |
| 7,270,515 B2 | 9/2007 | Liang | |
| 7,290,986 B2 | 11/2007 | Stegemiller et al. | |
| 7,431,562 B2 | 10/2008 | Hooper et al. | |
| 7,473,073 B1 | 1/2009 | Liang | |
| 7,494,319 B1 * | 2/2009 | Liang | 416/92 |
| 7,591,070 B2 | 9/2009 | Lee | |
| 7,704,045 B1 * | 4/2010 | Liang | 416/92 |
| 7,740,445 B1 * | 6/2010 | Liang | 415/173.5 |
| 7,857,587 B2 * | 12/2010 | Correia et al. | 416/92 |

(Continued)

OTHER PUBLICATIONS

U.S. Appl. No. 12/464,450, entitled Gas Turbine Blade With Double Impingement Cooled Single Suction Side Tip Rail.

(Continued)

*Primary Examiner* — Michelle Mandala (57) ABSTRACT

A turbine blade is provided comprising: an airfoil including an airfoil outer wall extending radially outwardly from a blade root, a squealer tip section located at an end of the airfoil distal from the root, and cooling structure. The squealer tip section comprises a blade tip surface including pressure and suction edges joined together at chordally spaced-apart leading and trailing edges of the airfoil, and a squealer tip rail. At least a substantial portion of the squealer tip rail is located near the blade tip surface suction edge. The cooling structure directs cooling fluid toward the squealer tip rail to effect impingement cooling of the rail after the cooling fluid has convectively cooled at least a portion of the airfoil outer wall. Cooling fluid is also deflected by the squealer tip rail so as to yield a very small effective flow area above the squealer tip section through which hot working gases may flow.

16 Claims, 4 Drawing Sheets

U.S. PATENT DOCUMENTS

| | | |
|---|---|---|
| 2002/0187042 A1 | 12/2002 | Lee et al. |
| 2006/0285974 A1 | 12/2006 | Bunker et al. |
| 2007/0128030 A1 | 6/2007 | Liang |
| 2007/0258815 A1 | 11/2007 | Liang |
| 2008/0118367 A1 | 5/2008 | Liang et al. |
| 2009/0214328 A1* | 8/2009 | Tibbott et al. .................. 415/115 |

OTHER PUBLICATIONS

Michelle Estrada; Non-final Office Action in U.S. Appl. No. 12/464,450; Jul. 20, 2011; U.S. Patent and Trademark Office; Alexandria, VA.

* cited by examiner

TURBINE BLADE WITH SINGLE TIP RAIL WITH A MID-POSITIONED DEFLECTOR PORTION

FIELD OF THE INVENTION

The present invention relates generally to gas turbine blades and, more particularly, to a blade squealer rail located along the tip of a turbine blade.

BACKGROUND OF THE INVENTION

In a turbomachine, such as a gas turbine engine, air is pressurized in a compressor then mixed with fuel and burned in a combustor to generate hot combustion gases. The hot combustion gases are expanded within the turbine section where energy is extracted to power the compressor and to produce useful work, such as powering a propeller for an aircraft in flight or turning a generator to produce electricity. The hot combustion gases travel through a series of turbine stages. A turbine stage may include a row of stationary vanes followed by a row of rotating turbine blades, where the turbine blades extract energy from the hot combustion gases for powering the compressor and providing output power. Since the turbine blades are directly exposed to the hot combustion gases, they are typically provided with internal cooling circuits which channel a coolant, such as compressor bleed air, through the airfoil of the blade and through various film cooling holes around the surface thereof. One type of airfoil extends from a root at a blade platform, which defines the radially inner flowpath for the combustion gases, to a radially outer cap or blade tip section, and includes opposite pressure and suction sides extending axially from leading to trailing edges of the airfoil. The cooling circuit extends inside the airfoil between the pressure and suction sides and is bounded at its top by the blade tip section.

The gas turbine engine efficiency is, at least in part, dependant upon the extent to which the high temperature gases leak across the gap between the turbine blade tips and the seals or shrouds which surround them. The leakage quantity is typically minimized by positioning the radially-outward blade tip section in close proximity to the outer air seal. However, differential thermal elongation and dynamic forces between the blade tip section and outer air seal can cause rubbing therebetween. Also, it should be noted that the heat load on the turbine blade tip section is a function of leakage flow over the blade tip section. Specifically, a high leakage flow will induce a high heat load to the blade tip section, such that gas leakage across the blade tip section and cooling of the blade tip section have to be addressed as a single problem. In a typical construction, see FIG. 6, the blade tip section 104 of an airfoil 100 has been provided with a squealer tip rail 102 extending radially outwardly a short distance from the blade tip section 104, and extending substantially completely around the perimeter of the airfoil 100 to define an inner squealer tip pocket 106 facing radially outwardly. The squealer tip rail 102 is provided for spacing radially closely adjacent to the stationary outer seal wall, or outer turbine shroud, to provide a relatively small clearance gap therebetween to seal or restrict the flow of gas across the blade tip section 104.

Figure 6:
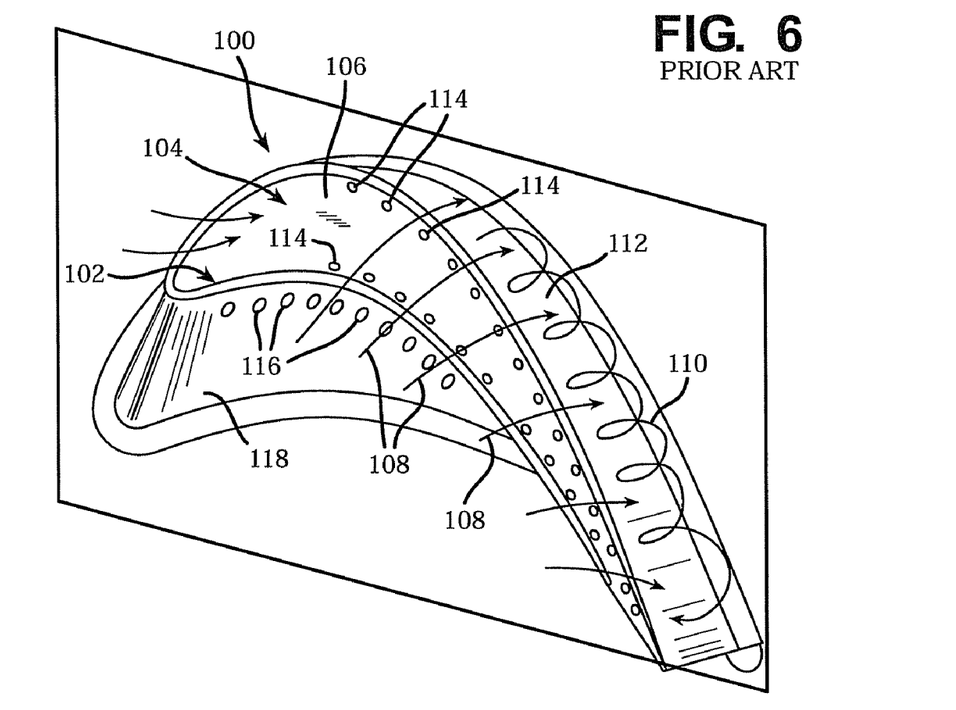
FIGS. 6 and 7 are views of a prior art airfoil.

The squealer tip rail 102 is a solid metal projection of the airfoil 100, and is directly heated by the combustion gas which flows thereover, as illustrated by flow lines 108. In addition, a vortex flow 110 of hot gases may be formed on the suction side of the airfoil 100 adjacent the blade tip. The squealer tip rail 102 is cooled by a cooling fluid, such as air, channeled from an airfoil cooling circuit to the blade tip section 104 to transfer heat away from the area of the squealer tip pocket 106. Convective cooling holes 114 may be provided in the squealer tip pocket 106 located along the squealer tip rail 102, as illustrated in FIG. 6. In addition, heat from the squealer tip rail 102 may be conducted into the squealer tip section 104 and convected away internally of the airfoil 100 by the cooling fluid channeled through the internal cooling circuit. The squealer tip section 104, including the squealer tip rail 102, typically operates at temperatures above that of the remainder of the airfoil 100 and can be a life limiting element of the airfoil 100 in a hot turbine environment. In particular, it is known in the art that the portion of the airfoil 100 located at the intersection of the pressure side airfoil surface 118 and the blade tip section 104 is subject to very high heat loads and accordingly is more likely to experience thermal distress.

Cooling to the pressure side airfoil surface 118 may be provided by a row of film cooling holes 116 located on the pressure side of the airfoil outer wall, extending from the leading edge to the trailing edge of the airfoil 100, immediately below the blade tip section 104 for providing a cooling fluid film which flows upwardly over the pressure side of the airfoil 100.

Figure 7:
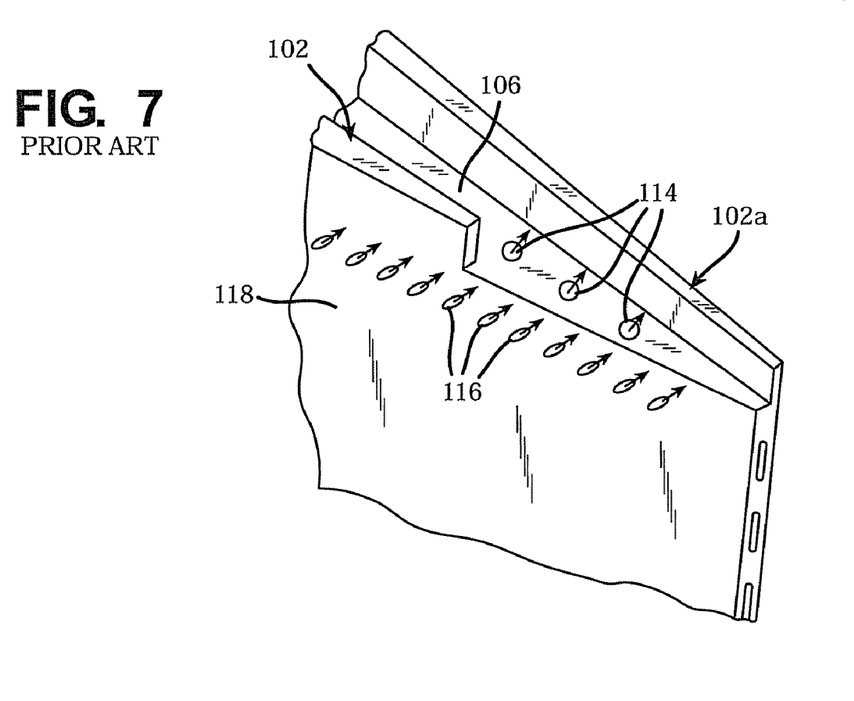

Referring to FIG. 7, an enlarged view of the trailing edge of the airfoil 100 of FIG. 6 is illustrated, where it may be seen that the aft end of the squealer tip rail 102 is discontinued on the side adjacent the pressure side surface 118 to form a single squealer tip rail 102a located on the suction side of the airfoil 100, which extends to the trailing edge of the airfoil 100. As a result primarily of the squealer pocket geometry and the interaction of hot gas secondary flow mixing, the effectiveness of the cooling fluid provided from the pressure side film holes 116 and from the cooling holes 114 in the bottom of the squealer pocket 106 at the aft end is very limited, such that the aft end of the suction side squealer rail 102a is substantially exposed to heating from three sides. As a consequence, the blade trailing edge tip section generally exhibits increased oxidation and erosion, adversely affecting the operating life of the turbine blade.

SUMMARY OF THE INVENTION

In accordance with a first aspect of the present invention, a turbine blade is provided comprising: an airfoil including an airfoil outer wall extending radially outwardly from a blade root, a squealer tip section located at an end of the airfoil distal from the root, and cooling structure. The squealer tip section comprises a blade tip surface including pressure and suction edges joined together at chordally spaced-apart leading and trailing edges of the airfoil, and a squealer tip rail. At least a substantial portion of the squealer tip rail is located near the blade tip surface suction edge. The cooling structure directs cooling fluid toward the squealer tip rail to effect impingement cooling of the rail after the cooling fluid has convectively cooled at least a portion of the airfoil outer wall.

The squealer tip rail may comprise a sole rail associated with the blade tip surface.

The cooling structure may comprise pressure-side cooling holes in communication with a cooling fluid circuit within the airfoil. The pressure-side cooling holes may extend toward the squealer tip rail to effect impingement cooling of the tip rail.

The squealer tip rail may comprise a deflector portion including a curved and concaved side surface substantially facing the blade tip surface pressure edge.

The cooling fluid exiting the pressure-side cooling holes may contact the concave side surface of the squealer tip rail deflector portion and deflect toward the blade tip surface pressure edge to push hot gas away from the squealer tip rail.

The pressure-side cooling holes may extend substantially parallel to the blade tip surface.

The cooling structure may further comprise suction-side cooling holes in communication with the cooling fluid circuit within the airfoil. The suction-side cooling holes may extend toward the squealer tip rail to effect further impingement cooling of the tip rail.

The squealer tip rail may further comprise an intermediate portion and an aft portion substantially facing the blade tip surface suction edge. The aft portion may include a curved lower part. Cooling fluid emitted from the suction-side cooling holes may strike the curved lower part and flow towards a stationary outer air seal so as to reduce an amount of hot gases flowing through a gap located between the tip section and the stationary outer air seal.

The cooling fluid circuit may comprise: first cooling channels located near the airfoil outer wall suction sidewall to convectively cool the suction sidewall, and second cooling channels located near the airfoil outer wall pressure sidewall to convectively cool the pressure sidewall.

In accordance with a second aspect of the present invention, a turbine blade is provided comprising: an airfoil including an airfoil outer wall extending radially outwardly from a blade root, the outer wall having pressure and suction sidewalls; a squealer tip section located at an end of the airfoil distal from the root; and cooling structure. The squealer tip section may comprise a blade tip surface including pressure and suction edges joined together at chordally spaced-apart leading and trailing edges of the airfoil and a squealer tip rail. At least a substantial portion of the squealer tip rail may be located, near the blade tip surface suction edge. The cooling structure may direct cooling fluid through forward and back portions of the squealer tip section toward the squealer tip rail.

The squealer tip rail may comprise a sole rail associated with the blade tip surface.

At least a substantial portion of the squealer tip rail may be spaced away from the blade tip surface pressure edge.

The squealer tip rail may comprise a deflector portion comprising a curved and concaved side surface substantially facing the blade tip surface pressure edge.

The squealer tip rail may further comprise an intermediate portion and an aft portion.

The cooling structure may comprise pressure-side cooling holes in communication with a cooling fluid circuit within the airfoil. The pressure-side cooling holes may extend toward the squealer tip rail deflector portion, wherein cooling fluid passing through the pressure-side cooling holes may serve to convectively cool the forward portion of the squealer tip section.

The cooling fluid exiting the pressure-side cooling holes may contact the concave side surface of the squealer tip rail deflector portion and deflect toward the blade tip surface pressure edge to push hot gas away from the squealer tip rail.

The cooling structure may further comprise suction-side cooling holes in communication with the cooling fluid circuit within the airfoil. The suction-side cooling holes may extend toward the squealer tip rail, wherein cooling fluid passing through the suction-side cooling holes may serve to convectively cool the rear portion of the blade tip section.

The cooling fluid circuit may comprise first cooling channels located near the airfoil outer wall suction sidewall. The suction-side cooling holes may communicate with the first cooling channels.

The cooling fluid circuit may comprise second cooling channels located near the airfoil outer wall pressure sidewall. The pressure-side cooling holes may communicate with the second cooling channels.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

The present invention provides a construction for a blade tip section of a rotating blade for a gas turbine of a combustion gas turbine engine, where the blade tip section includes a squealer tip rail that is configured to provide a reduction in a vena contractor associated with hot gas leakage flow passing the blade tip section. The geometry of the squealer tip rail operates in combination with injected cooling fluid to reduce blade hot gas leakage flow and heat load.

The gas turbine engine further includes a compressor and a combustor, including a plurality of combustor units. The compressor compresses ambient air.

The combustor units combine the compressed air with a fuel and ignite the mixture creating combustion products defining hot working gases. The working gases are routed to the turbine inside a plurality of transition ducts. Within the turbine are a series of rows of stationary vanes and rotating blades. The rotating blades are coupled to a shaft and disc assembly. As the working gases expand through the turbine, the working gases cause the blades, and therefore the disc assembly, to rotate.

Figure 1:
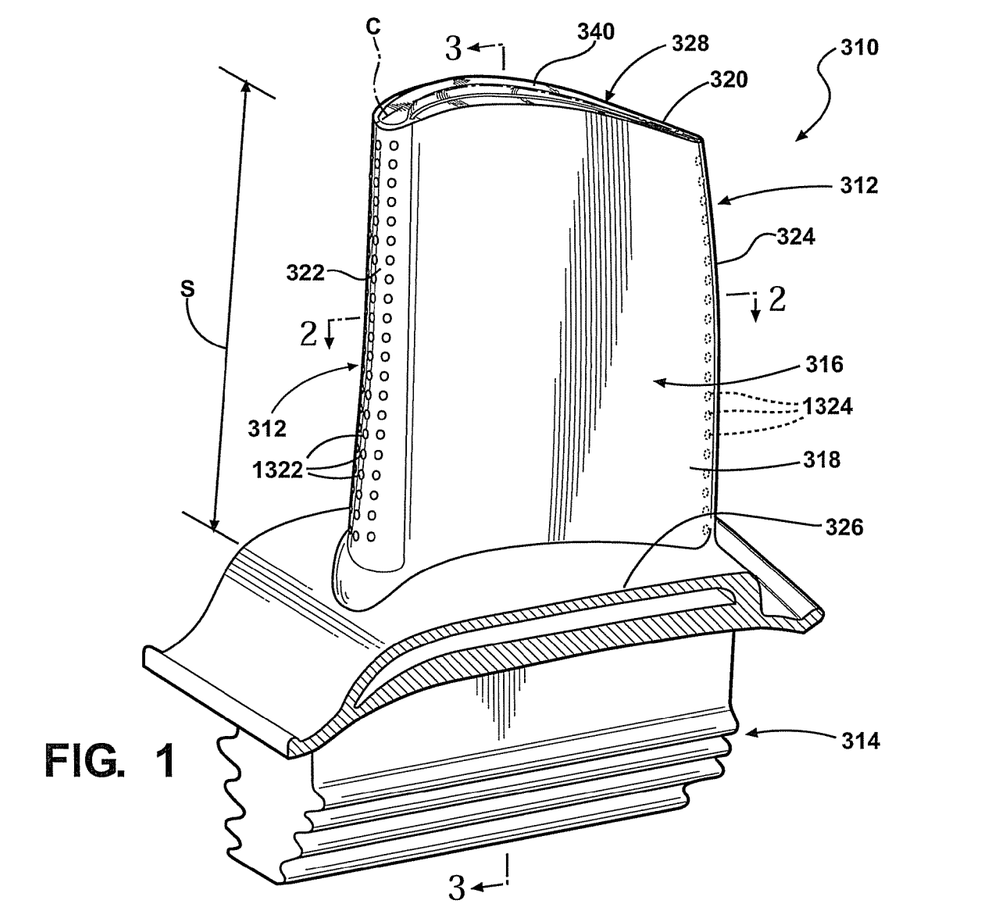
FIG. 1 is a perspective view of a turbine blade constructed in accordance with the present invention.

Referring to FIG. 1, an exemplary turbine blade 310 constructed in accordance with a first embodiment of the present invention is illustrated. The blade 310 includes an airfoil 312 and a root 314, which is used to conventionally secure the blade 310 to the shaft and disc assembly of the turbine for supporting the blade 310 in the working gas flow path of the turbine. The airfoil 312 has an outer wall 316 comprising a pressure sidewall 318 and a suction sidewall 320, see FIGS. 2 and 3. The pressure and suction sidewalls 318, 320 are joined together along an upstream airfoil leading edge 322 and a downstream airfoil trailing edge 324, where the leading and trailing edges 322, 324 are spaced axially or chordally from each other with respect to a chordal direction C, see FIG. 1. The airfoil 312 extends radially along a longitudinal or radial direction of the blade 310, defined by a span S of the airfoil 312, from a radially inner airfoil platform 326 to a radially outer squealer tip cap or squealer tip section 328.

Figure 3:
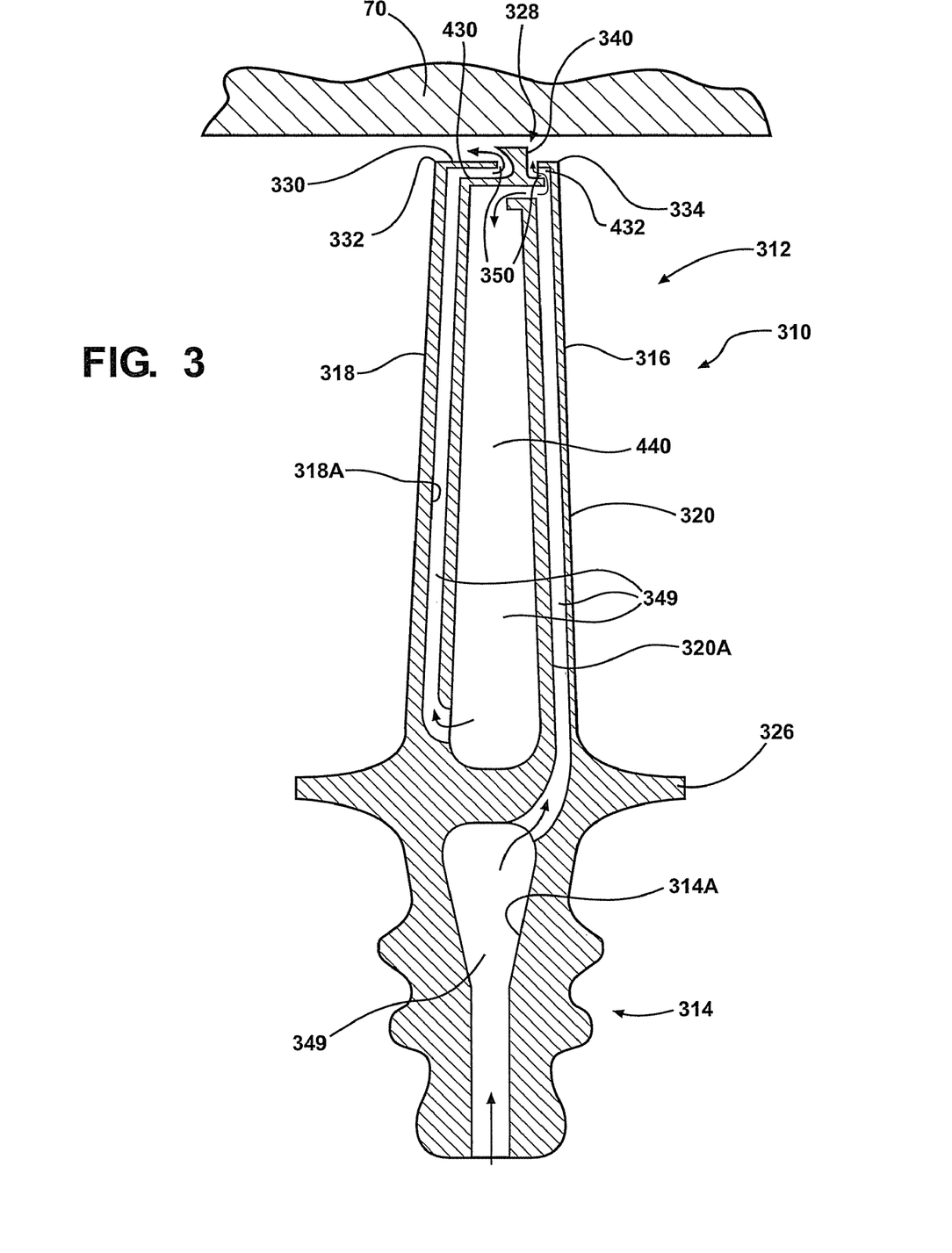
FIG. 3 a sectional view taken along section line 3-3 in FIG. 1.
Figure 4:
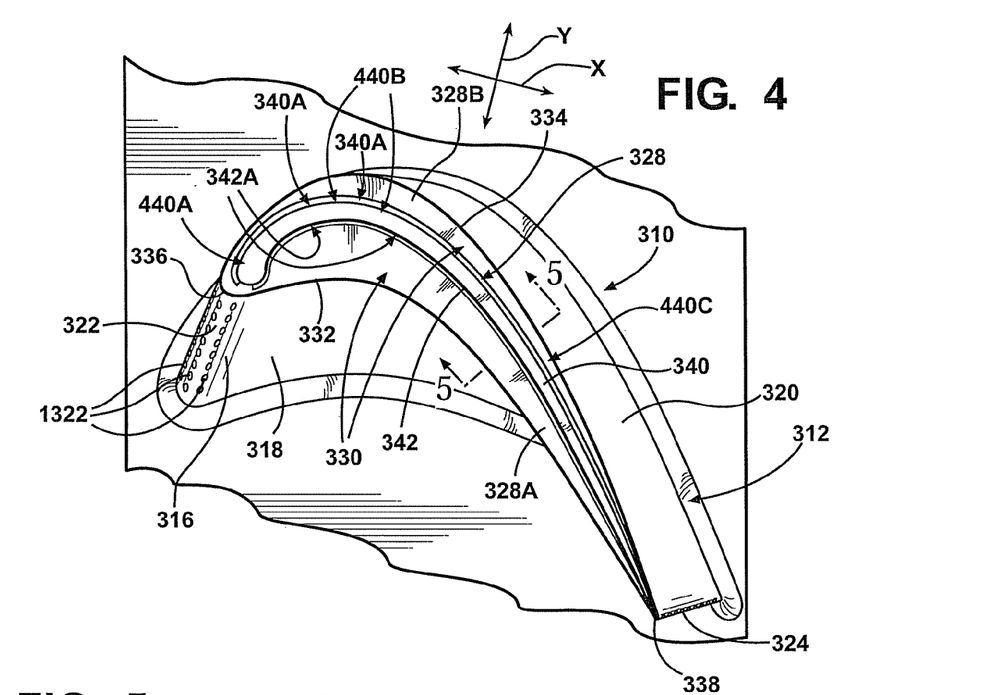
FIG. 4 is a top view of the turbine blade of the present invention.

The squealer tip section 328 includes a blade tip surface 330 having an airfoil shape and pressure and suction edges 332, 334, which are joined together at chordally spaced apart leading and trailing edges 336, 338 of the squealer tip section 328 and the airfoil leading and trailing edges 322 and 324, see FIG. 4. The pressure and suction edges 332, 334 coincide with the pressure and suction sidewalls 318, 320, respectively, of the airfoil 312. In the illustrated invention, a sole squealer tip rail 340 extends radially outwardly from the blade tip surface 330, see FIGS. 1 and 3-5.

The squealer tip rail 340 comprises in the embodiment illustrated in FIG. 4, a curved leading part 440A, a curved intermediate part 440B and a generally linear trailing part 440C. The curved leading part 440A is positioned near the blade tip surface pressure edge 332, see FIG. 4. The curved intermediate part 440B extends from the curved leading part 440A, and the trailing part 440C extends from the intermediate part 440B to or near the airfoil trailing edge 324. The squealer tip rail leading, intermediate and trailing parts 440A-440C define a deflector portion 342, an intermediate portion 344 extending from the deflector portion 342, and an aft portion 346 extending from the intermediate portion 344, see FIG. 5. As illustrated in FIG. 4, a substantial part 340A of the squealer tip rail 340, including the curved intermediate part 440B and at least a section of the trailing part 440C, is spaced away from the blade tip surface pressure edge 332 and is located near the blade tip surface suction edge 334. Accordingly, a substantial part 342A of the deflector portion 342 is displaced from the blade tip surface pressure edge 332. Further, all of the deflector portion 342 is spaced away from the airfoil leading edge 322. A base 348 of the tip rail 340 is located below, i.e., radially inward, of the blade tip surface 330, see FIG. 5.

Figure 5:
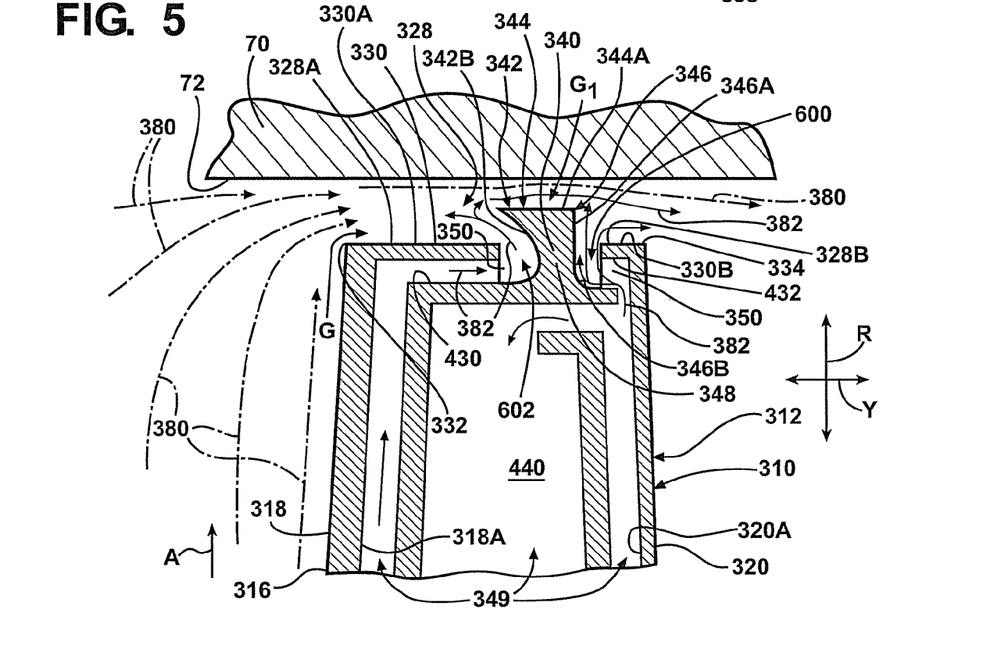
FIG. 5 is a sectional view taken along section line 5-5 in FIG. 4.

The squealer tip rail deflector portion 342 comprises a curved and concaved side surface 342B substantially facing the blade tip surface pressure edge 332, see FIG. 5. The squealer tip rail intermediate portion 344 includes a substantially planar upper surface 344A and the aft portion 346 includes a substantially vertical side surface 346A that faces towards the suction edge 334 of the blade tip surface 330 and a curved lower part 346B.

Figure 2:
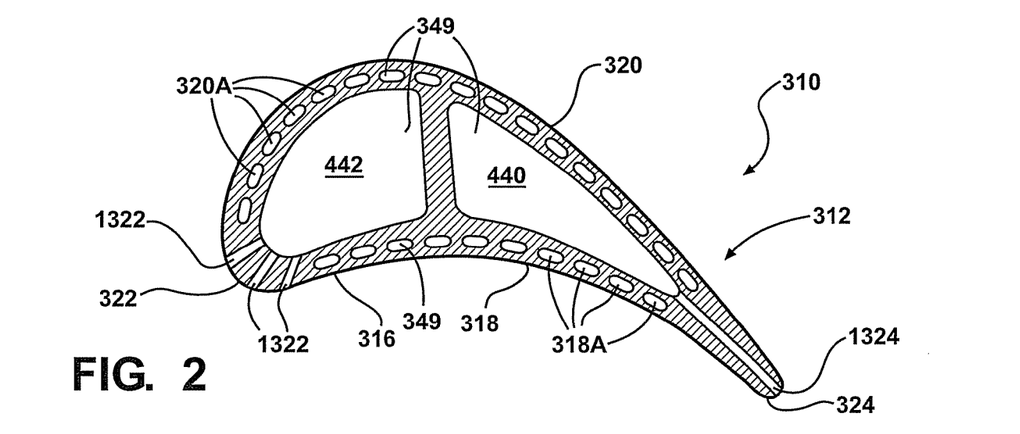
FIG. 2 is a sectional view taken along section line 2-2 in FIG. 1.

The airfoil 312 also comprises a cooling fluid circuit 349, see FIGS. 2, 3 and 5, which receives cooling fluid through a dove-tailed recess 314A defined in the root 314, which cooling fluid, e.g., air, is supplied by the compressor.

The airfoil 312 further comprises cooling structure 350 in communication with the cooling fluid circuit 349, see FIGS. 3 and 5. The cooling structure 350 comprises a plurality of chordally spaced-apart pressure-side cooling holes 430 defined in a forward portion 328A of the squealer tip section 328 and a plurality of chordally spaced-apart suction-side cooling holes 432 formed in a back portion 328B of the squealer tip section 328. More specifically, the pressure-side cooling holes 430 are located below and are substantially parallel with a leading section 330A of the blade tip surface 330, while the suction-side cooling holes 432 are located below and substantially parallel with a trailing section 330B of the blade tip surface 330. As will be discussed further below, the pressure-side cooling holes 430 and suction-side cooling holes 432 receive cooling fluid from the cooling fluid circuit 349.

In the illustrated embodiment, the cooling fluid circuit 349 comprises: a plurality of chordally spaced-apart first cooling channels 320A formed in the airfoil suction sidewall 320, a plurality of chordally spaced-apart second cooling channels 318A formed in the airfoil pressure sidewall 318, and first and second collection cavities 440 and 442 located between the airfoil pressure and suction sidewalls 318 and 320, see FIGS. 2, 3 and 5.

The first cooling channels 320A communicate with the dove-tailed recess 314A, the first and second collection cavities 440 and 442, and the suction-side cooling holes 432, see FIGS. 2, 3 and 5. The second cooling channels 318A communicate with the first and second collection cavities 440 and 442, and the pressure-side cooling holes 430, see FIGS. 2, 3 and 5.

During operation of the turbine, the compressor supplies cooling fluid to the root dove-tailed recess 314A. The cooling fluid moves from the recess 314A into and through the first cooling channels 320A, where the moving cooling fluid convectively cools the airfoil suction sidewall 320. From the first cooling channels 320A, a first portion of the cooling fluid moves into the first and second collection cavities 440 and 442, while a second portion of the cooling fluid passes into and through the suction-side cooling holes 432, see FIG. 5. The cooling fluid passing through the suction-side cooling holes 432 convectively cools the back portion 328B of the squealer tip section 328. As noted above, the base 348 of the tip rail 340 is located below the blade tip surface 330, see FIG. 5. A trailing side recess 600 is formed between the vertical side surface 346A and the back portion 328B of the squealer tip section 328, see FIG. 5. The cooling fluid, after passing through the suction-side cooling holes 432, exits the cooling holes 432, passes into the trailing side recess 600, and then strikes against the aft portion vertical side surface 346A and the curved lower part 346B to effect impingement cooling of the side surface 346A and the lower part 346B. It is believed that at least a portion of the cooling fluid entering the trailing side recess 600 forms into vortices within the recess 600 such that the cooling fluid is held or trapped near the aft portion vertical side surface 346A and the aft portion lower part 346B for an extended time period to enhance cooling of the vertical side surface 346A and the curved lower part 346B. A small clearance gap G, which includes a gap section $G_1$, is defined between the turbine blade squealer tip section 328 and an inner surface 72 of a turbine blade outer air seal 70. The small gap section $G_1$ is located between the deflector portion intermediate portion 344 and the outer air seal 70. It is also believed that a portion of the cooling fluid emitted into the trailing edge recess 600 strikes the curved lower part 346B and flows upward so as to provide resistance to hot gases flowing through the small gap section $G_1$, and an area within the gap G just downstream from the gap section $G_1$. It is still further believed that a portion of the cooling fluid emitted into the trailing edge recess 600 flows over the trailing section 330B of the blade tip surface 330 so as to form a cooling film over the trailing section 330B.

As noted above, a first portion of the cooling fluid from the first cooling channels 320A moves into the first and second collection cavities 440 and 442. Part of the cooling fluid received in the first and second collection cavities 440 and 442 exits those collection cavities 440 and 442 and enters into the second cooling channels 318A. A remaining portion of the cooling fluid in the first collection cavity 440 exits the collection cavity 440 via a plurality of bores 1324 provided in the airfoil trailing edge 324 so as to convectively cool the trailing edge 324, see FIGS. 1 and 2. A remaining portion of the cooling fluid in the second collection cavity 442 exits the collection cavity 442 via a plurality of bores 1322 in the airfoil leading edge 322 so as to effect cooling of the airfoil leading edge 322, see FIGS. 1 and 2.

As the cooling fluid moves through the second cooling channels 318A, it functions to convectively cool the airfoil pressure sidewall 318. From the second cooling channels 318A, the cooling fluid moves into and through the pressure-side cooling holes 430, see FIG. 5. The cooling fluid passing through the pressure-side cooling holes 430 convectively cools the forward portion 328A of the squealer tip section 328. As noted above, the base 348 of the tip rail 340 is located below the blade tip surface 330, see FIG. 5. A leading side recess 602 is formed between the curved and concaved side surface 342B and the front portion 328A of the squealer tip section 328, see FIG. 5. The cooling fluid, after passing through the pressure-side cooling holes 430, exits the cooling holes 430, passes into the leading side recess 602, and then strikes against the side surface 342B to effect impingement cooling of that surface 342B. As will be discussed further below, the cooling fluid exiting the pressure-side cooling holes 430 is turned by the side surface 342B.

The fixed turbine blade outer air seal 70 surrounds the turbine blades 310. As illustrated in FIG. 5, the small clearance gap G, which includes the gap section $G_1$, is defined between the turbine blade squealer tip section 328 and the inner surface 72 of the turbine blade outer air seal 70.

In FIG. 5, dotted-dashed arrows 380 indicate hot gases flowing toward and through the gap G between the turbine blade 310 and the inner surface 72 of the air seal 70. Solid line arrows 382 designate cooling fluid exiting the pressure-side and suction-side cooling holes 430 and 432 and flowing into and through the first and second collection cavities 440 and 442, the first cooling channels 318A and the second cooling channels 320A.

Because of a pressure differential between the airfoil pressure sidewall 318 and the airfoil suction sidewall 320, hot working gases 380 flow upward along the airfoil pressure sidewall 318 in a direction designated by arrow A in FIG. 5 toward the gap G.

As noted above, the cooling fluid exiting the pressure-side cooling holes 430 strikes the side surface 342B. A portion of that cooling fluid is turned by the side surface 342B towards the incoming hot gases 380. It is believed that the turned cooling fluid 382 acts against incoming hot gases 380 and functions to push those hot gases 380 away from the deflector portion 342 and upward toward the turbine blade outer air seal inner surface 72. It is also believed that a further portion of the cooling fluid that strikes the side surface 342B flows around the side surface 342B and then flows through the gap section $G_1$ located between the deflector portion intermediate portion 344 and the outer air seal 70, see FIG. 5. The cooling fluid flowing through the gap section $G_1$ reduces an effective radial dimension of a flow path for the hot gases 380 passing through the gap section $G_1$. Accordingly, the amount of hot gases 380 entering the gap section $G_1$ is reduced. The cooling fluid passing through the gap section $G_1$ also forms a cooling film provided over the intermediate and aft portions 344, 346. Because the amount of hot gases flowing through the gap G is minimized, the overall efficiency of the turbine is increased, the temperature of each turbine blade squealer tip section 328 is reduced, thermally induced stresses at each turbine blade squealer tip section 328 are minimized, the life expectancy of each of the blades 310 is increased, and the amount of cooling fluid required to cool each turbine blade squealer tip section 328 is minimized. It is believed that the combined effect of: cooling fluid emitted by the pressure-side and suction-side cooling holes 430 and 432 effecting impingement cooling of the squealer tip rail 430, cooling fluid turned by the squealer tip rail deflector portion side surface 342B towards the incoming hot gases 380 and cooling fluid turned by the aft portion curved lower part 346B towards the air seal inner surface 72 yields a very small effective flow area in the gap G through which hot working gases may flow.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A turbine blade comprising:
an airfoil including an airfoil outer wall extending radially outwardly from a blade root;
a blade tip surface located at an end of said airfoil distal from said root, said blade tip surface including pressure and suction edges joined together at chordally spaced-apart leading and trailing edges of said airfoil;
a squealer tip rail located adjacent to said blade tip surface and comprising a deflector portion, an intermediate portion extending from said deflector portion and an aft portion extending from said intermediate portion, wherein a substantial part of said deflector portion is located generally mid-way between said blade tip surface pressure and suction edges;
cooling structure directing cooling fluid into said squealer tip rail deflector portion; and
cooling passages extending to said airfoil outer wall at a location radially inwardly from an intersection of said outer wall and said blade tip surface pressure edge, said cooling passages being in communication with a cooling fluid circuit within said airfoil and angled so as to release cooling fluid in a direction away from said blade tip surface.

2. The turbine blade as set out in claim 1, wherein said squealer tip rail comprises a sole rail associated with said blade tip surface.

3. The turbine blade as set out in claim 2, wherein said deflector portion of said squealer tip rail comprises a curved and concaved side surface substantially facing said blade tip surface pressure edge.

4. The turbine blade as set out in claim 3, wherein substantially all of said deflector portion is spaced away from said airfoil leading edge.

5. The turbine blade as set out in claim 3, wherein said intermediate portion includes a substantially planar surface and said aft portion tapers away from said intermediate portion towards said airfoil leading edge and said blade tip surface suction edge.

6. The turbine blade as set out in claim 3, wherein said cooling structure comprises first cooling holes in communication with said cooling fluid circuit within said airfoil, said first cooling holes terminating at openings within said squealer tip rail deflector portion.

7. The turbine blade as set out in claim 6, wherein said squealer tip rail deflector portion is configured and said first cooling holes are located such that said cooling fluid exiting said first cooling holes contacts said concave side surface of said squealer tip rail deflector portion, a first portion of said cooling fluid is deflected by said deflector portion toward said blade tip surface pressure edge to push hot gas away from said squealer tip rail and a second portion of said cooling fluid passes over said deflector portion and into a gap section located between said deflector portion intermediate section and a stationary outer air seal so as to reduce the amount of hot gases passing through said gap section.

8. A turbine blade comprising:
an airfoil including an airfoil outer wall extending radially outwardly from a blade root;
a blade tip surface located at an end of said airfoil distal from said root, said blade tip surface including pressure and suction edges joined together at chordally spaced-apart leading and trailing edges of said airfoil;
a squealer tip rail located adjacent to said blade tip surface;
cooling structure directing cooling fluid toward said squealer tip rail; and
cooling passages extending to said airfoil outer wall at a location radially inwardly from an intersection of said outer wall and said blade tip surface pressure edge, said cooling passages are in communication with a cooling fluid circuit within said airfoil and are angled so as to release cooling fluid in a direction away from said blade tip surface, said cooling fluid acting to deflect outward a portion of hot gases moving upward along said airfoil outer wall.

9. The turbine blade as set out in claim 8, wherein said squealer tip rail comprises a sole rail associated with said blade tip surface.

10. The turbine blade as set out in claim 9, wherein at least a substantial portion of said squealer tip rail is spaced away from said blade tip surface pressure edge and said airfoil leading edge.

11. The turbine blade as set out in claim 10, wherein said squealer tip rail comprises a deflector portion comprising a curved and concaved side surface substantially facing said blade tip surface pressure edge.

12. The turbine blade as set out in claim 11, wherein said concaved side surface has upper and lower sections, said lower section is nearer to said blade tip surface than said upper section, and said upper section being nearer to said blade tip surface pressure edge than said lower section.

13. The turbine blade as set out in claim 12, wherein said squealer tip rail further comprises an intermediate portion and an aft portion tapering away from said intermediate portion towards said airfoil leading edge and said blade tip surface suction edge.

14. The turbine blade as set out in claim 13, wherein said cooling structure comprises first cooling holes in communication with said cooling fluid circuit within said airfoil, said first cooling holes terminating at openings located within said squealer tip rail deflector portion.

15. The turbine blade as set out in claim 1, wherein said cooling passages are angled such that cooling fluid discharged from said cooling passages includes a component in the radially inward direction.

16. The turbine blade as set out in claim 8, wherein said cooling passages are angled such that cooling fluid discharged from said cooling passages includes a component in the radially inward direction.

* * * * *